US009280238B2

(12) United States Patent
Posamentier

(10) Patent No.: US 9,280,238 B2
(45) Date of Patent: Mar. 8, 2016

(54) ELECTRICAL TOUCH SCREEN SENSOR

(75) Inventor: Joshua Posamentier, Oakland, CA (US)

(73) Assignee: Intel Corporation, Santa Clara, CA (US)

(*) Notice: Subject to any disclaimer, the term of this patent is extended or adjusted under 35 U.S.C. 154(b) by 2012 days.

(21) Appl. No.: 11/513,672

(22) Filed: Aug. 30, 2006

(65) Prior Publication Data

US 2008/0055260 A1  Mar. 6, 2008

(51) Int. Cl.
*G06F 3/041* (2006.01)
*G06F 3/044* (2006.01)

(52) U.S. Cl.
CPC ............... *G06F 3/044* (2013.01); *G06F 3/041* (2013.01); *G06F 3/0412* (2013.01); *G06F 3/0416* (2013.01)

(58) Field of Classification Search
CPC ............ G06F 3/0412; G06F 3/044; G06F 2200/1612; G06F 2203/04108
USPC .................................. 345/173–182
See application file for complete search history.

(56) References Cited

U.S. PATENT DOCUMENTS

| | | | |
|---|---|---|---|
| 5,729,604 A * | 3/1998 | Van Schyndel | 379/388.01 |
| 6,239,788 B1 * | 5/2001 | Nohno et al. | 345/173 |
| 7,499,114 B2 * | 3/2009 | Choi et al. | 349/12 |
| 7,852,417 B2 * | 12/2010 | Abileah et al. | 349/12 |
| 7,932,898 B2 * | 4/2011 | Philipp et al. | 345/174 |
| 8,654,083 B2 * | 2/2014 | Hotelling et al. | 345/173 |
| 2005/0029245 A1 * | 2/2005 | Gerola et al. | 219/447.1 |
| 2006/0007222 A1 * | 1/2006 | Uy | 345/207 |
| 2007/0171211 A1 * | 7/2007 | Perski et al. | 345/173 |

OTHER PUBLICATIONS den Boer et al: 56.3: Active Matrix LCD with Integrated Optical Touch Screen; Planar Systems, Inc., Beaverton, OR., SID 03 Digest, 4 pages.

* cited by examiner

*Primary Examiner* — Dorothy Harris
*Assistant Examiner* — Leonid Shapiro
(74) *Attorney, Agent, or Firm* — Trop Pruner & Hu, P.C.

(57) ABSTRACT

Apparatus, systems including an electrical touch screen sensor and methods for implementing an electrical touch screen sensor are disclosed. For example, an apparatus is disclosed including a display having an array of display pixels and a plurality of sensors distributed amongst the display pixels and embedded within the display, where the sensors act to detect changes in capacitance associated with objects placed in proximity to the display pixels. Other implementations are also disclosed.

7 Claims, 5 Drawing Sheets

ELECTRICAL TOUCH SCREEN SENSOR

BACKGROUND

Flat panel displays incorporating touch screen features usually employ either capacitive or resistive detection mechanisms. A typical resistive touch screen thin-film transistor liquid crystal display (TFT LCD) employs a flexible conductive membrane and a moderately conductive substrate placed over the TFT LCD panel to detect objects physically touching the front of the display. When an object deforms the membrane enough to contact the underlying substrate a controller determines the position of the resulting contact by measuring the resistance between that contact point and the edges of the underlying substrate. By contrast, a typical capacitive touch screen TFT LCD uses a series of materials including a thin transparent conductive layer (e.g., Indium Tin Oxide (ITO)) overlaying the display panel to detect the capacitive coupling resulting from objects placed in proximity to the conductive layer.

Traditional resistive touch screen displays are mechanically complex and require physical pressure to detect objects. Both techniques add a significant number of relatively complex steps to the manufacturing process and tend to reduce the resulting display's optical performance. In addition, standard approaches to both technologies produce displays that require added calibration and testing in the post-manufacturing production process and the resulting displays are typically less robust then similar non-touch screen displays. Further, neither standard resistive nor standard capacitive touch screen displays are capable of sensing multiple touching or proximity events simultaneously.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
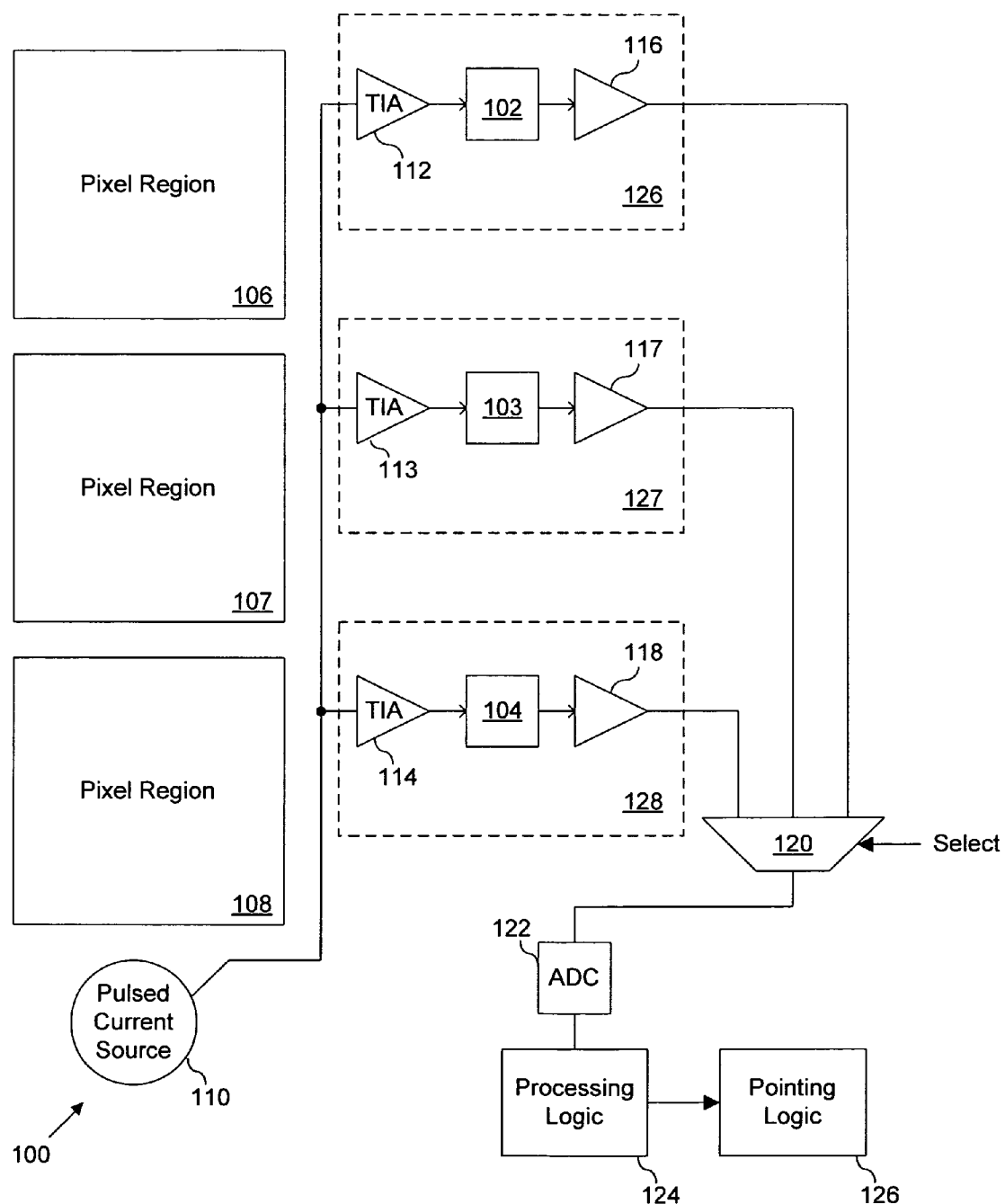
FIG. 1 illustrates portions of a touch screen display panel in accordance with some implementations of the invention.

FIG. 1 is a simplified block diagram of a portion 100 of a touch screen display panel in accordance with some implementations of the claimed invention. Portion 100 includes a set of capacitance detection elements (CDEs) 102-104 where each of CDEs 102-104 is associated with a respective one of a set of pixel areas and/or regions 106-108. In addition, a pulsed current source 110 supplies current pulses to a set of transimpedance amplifiers (TIAs) 112-114 where each of TIAs 112-114 may act to convert the current pulses received from source 110 into voltage pulses supplied to a respective one of CDEs 102-104. Further, a set of buffers 116-118 are coupled to CDEs 102-104 such that respective ones of buffers 116-118 acts to "read" and/or receive and/or obtain the voltage pulses from an associated one of CDEs 102-104. A multiplexer (MUX) 120 may, in response to a selection signal (select), supply output from one of buffers 116-118 to an analog-to-digital converter (ADC) 122 which, in turn, may feed control and/or processing logic 124 with a signal corresponding to a digitized output of one of buffers 116-118. Finally, pointing logic 126 may control a pointing system (not shown) in response to information provided by processing logic 124. Each combination of TIA, CDE and buffer may be collectively identified as one of a set of capacitance detectors 126-128 each of which comprises an electrical touch screen sensor in accordance with some implementations of the invention. Those skilled in the art may recognize that each of detectors 126-128 may exhibit capacitance detection functionality similar to that provided by well known triangle wave response or pulse response style capacitance measurement systems.

In accordance with some implementations of the invention, each of detectors 126-128 may be used to detect the simultaneous proximity of moderately conductive objects (such as human fingers) to the associated pixel regions 106-108. Thus, for example, detector 126 may be used to detect the proximity of an object to pixel region 106 while, at the same time, detector 128 may be used to detect the proximity of the same object or another object to pixel region 108. In accordance with some implementations of the invention, any of detectors 126-128 may provide detection of an object by the corresponding capacitive coupling of the object to the associated one of CDEs 102-104 where that capacitive coupling may modify the profile of a voltage pulse applied to the CDE by the associated one of TIAs 112-114. In accordance with some implementations of the invention each of CDEs 102-104 may comprise a conductive plate and/or area that may be 10-100 square microns in area where that area may be located adjacent to a display pixel of a display pixel region. Further, in accordance with some implementations of the invention, the pixels of pixels regions 106-108 may be TFT LCD pixels and CDEs 102-104 may comprise conductive regions formed within some of the same material layers as the pixels of pixels regions 106-108. The functionality and uses of current source 109, TIAs 112-114, buffers 116-118, MUX 120, and ADC 122 are well known in the art and will not be discussed in greater detail herein.

Processing logic 124 may assess changes in the capacitance of CDEs 102-104 to determine which of pixel regions 106-108 is associated with a proximate object. In this manner, processing logic 124 may act to map the distribution among pixel regions 106-108 of capacitive coupling associated with proximate objects. In other words, processing logic 124 may act to map the distribution among pixel regions 106-108 of "touching events" associated with objects such as fingers placed in proximity to pixel regions 106-108. Processing logic 124 may then convey to pointing logic 126 the identity of those pixel regions 106-108 associated with proximate objects. Pointing logic 126 may then use the identity of those pixel regions to establish where the physical locations of the proximate object(s) are relative to portion 100. The functionality and uses of processing logic 124 and pointing logic 126 will be discussed in further detail below.

Figure 2:
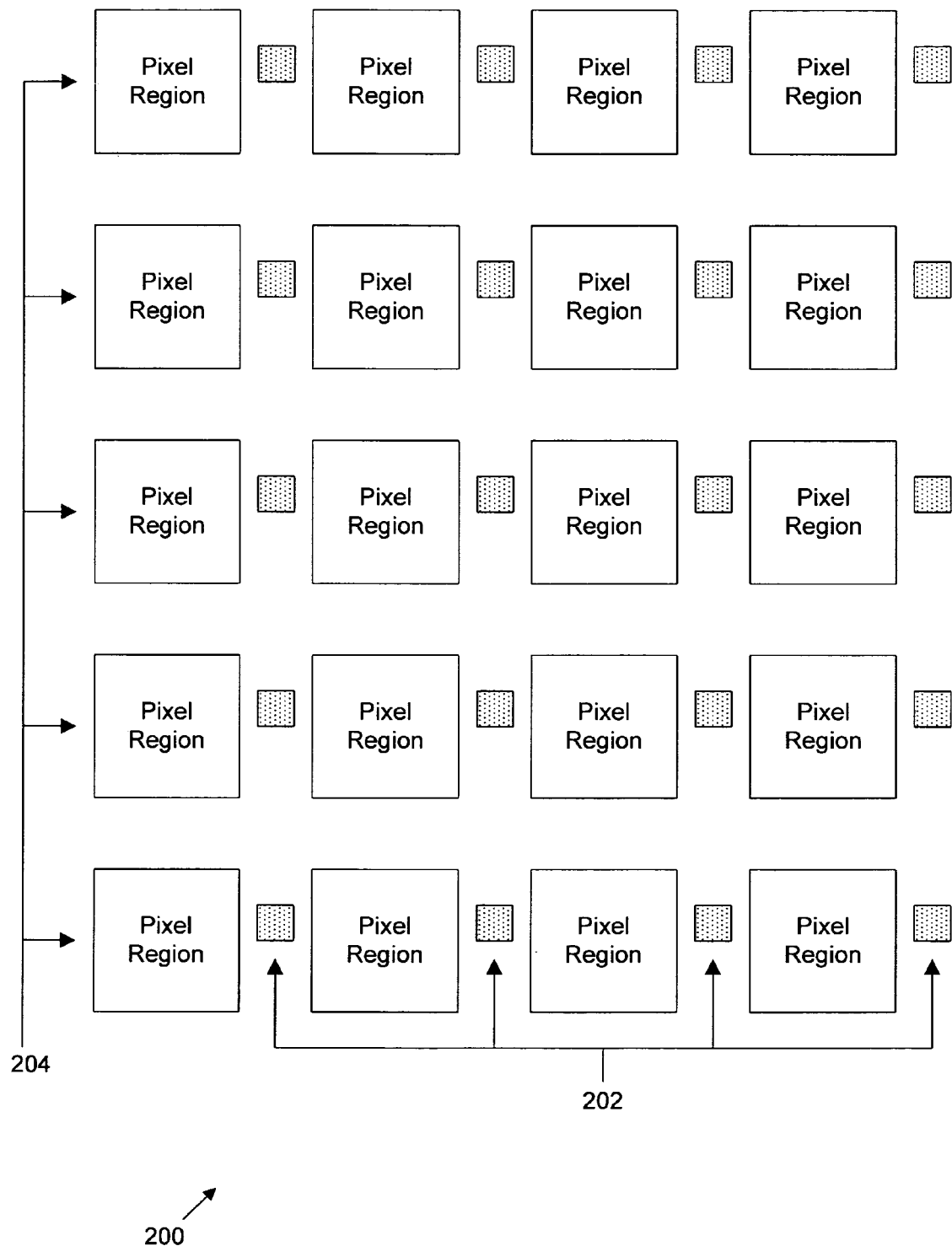
FIG. 2 illustrates portions of another touch screen display panel in accordance with some implementations of the invention.

FIG. 2 is a simplified block diagram of a larger portion 200 of a touch screen display panel in accordance with some implementations of the claimed invention. Panel portion 200 includes a set of capacitance detectors 202 (e.g., similar to detectors 126-128 of portion 100) dispersed among and associated with an array of pixel regions 204. In accordance with some implementations of the claimed invention, detectors 202 may enable the simultaneous detection of proximity to pixel regions 204 and/or the simultaneous detection of proximity to any subset of pixel regions 204. In accordance with some implementations of the invention, pixel regions 204 may include any number of discrete display pixels. Thus, in some implementations of the invention, each of pixel regions 204 may include one display pixel while, in other implementations of the invention, each of pixel regions 204 may include two or more display pixels.

In accordance with some implementations of the invention, pixel regions 204 may, overall, comprise an array of display pixels and detectors 202 may be dispersed among that pixel array in a variety of distributions. In other words, while FIG. 2 shows a regular 1:1 distribution of detectors 202 among pixel regions 204 (i.e., one detector 202 for each pixel region 204), the invention is not limited to a particular distribution of detectors 202 among pixel regions 204 or to a particular ratio of detectors 202 to pixel regions 204. Thus, in accordance with the invention, detectors 202 may be distributed among pixel regions 204 in any ratio, integer or otherwise, and in any spatial distribution. For example, in other implementations of the invention, detectors 202 may be distributed among pixel regions 204 in a 1:2 ratio (i.e., one detector 202 for every two pixel regions 204), 1:3 ratio; 1:4 ratio, 1:2.5 ratio, etc.

Those skilled in the art will recognize that some components typically found in or associated with a display panel (e.g., row and column driver circuitry, etc.) and not particularly germane to the claimed invention have been excluded from FIGS. 1 and 2 so as not to obscure implementations of the invention. Further, the invention is not limited to the type of display pixel included in areas 106-108 and/or 204. The functionality and uses of capacitance detectors 126-128 and/or 202 in relation to pixel regions 106-108 and/or 204 will be explained in greater detail below.

Figure 3:
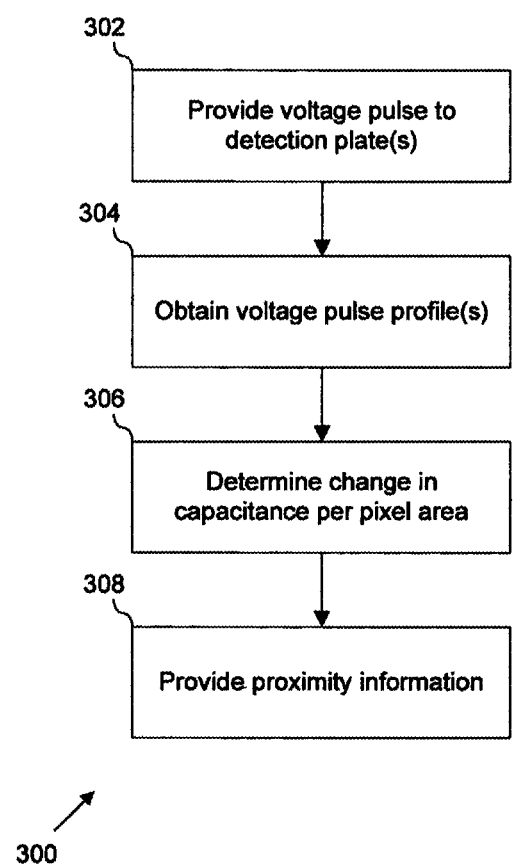
FIG. 3 is a flow chart illustrating a process in accordance with some implementations of the invention.

FIG. 3 is a flow chart illustrating a process 300 in accordance with some implementations of the invention. While, for ease of explanation, process 300 may be described with regard to items shown in FIGS. 1 and/or 2, the claimed invention is not limited in this regard and other processes or schemes supported by appropriate devices in accordance with the claimed invention are possible.

Process 300 may begin with the provision of a voltage pulse to detection plate(s) [act 302]. In some implementations of the invention act 302 may be undertaken by having current source 110 supply a current pulse to TIAs 112-114. In turn, each of TIAs 112-114 may convert that current pulse into a voltage pulse and provide that voltage pulse to a corresponding one of CDEs 102-104. The manner in which a TIA converts a current pulse into a voltage pulse is well known in the art and will not be described in detail herein.

Process 300 may then continue with the obtainment of voltage pulse profile(s) [act 304]. In accordance with some implementations of the invention, act 304 may involve each of buffers 116-118 obtaining and/or reading, from CDEs 102-104, the voltage pulse that was provided by the corresponding one of TIAs 112-114 to a corresponding one of CDEs 102-104 in act 302. Buffers 116-118 may then convey those voltage profile(s) to MUX 120. From MUX 120 any given one of the separate voltage profiles provided by buffers 116-118 may be conveyed to ADC 122 in response to an indicator (e.g., select signal). The manner in which a buffer obtains a voltage profile and the manner in which a MUX provides that voltage profile to an ADC are well known in the art and will not be described in detail herein.

Process 300 may then conclude with the determination of change in capacitance per pixel region [act 306]. In accordance with some implementations of the invention, act 306 may be undertaken by having logic 124 process the voltage profile(s) it receives from ADC 122. One way to do this is to have logic 124 compare the voltage profile(s) obtained in act 304 with a predetermined reference voltage profile where that reference voltage profile corresponds to a reference capacitance detected by any of detectors 126-128 or 202 in the absence of capacitance coupling effects resulting from objects in proximity to pixel regions 106-108/204 and associated detectors 126-128/202. Those skilled in the art will recognize that the voltage profiles provided by capacitance detectors such as detectors 126-128 or 202 in the presence of capacitance coupling effects resulting from proximate objects may be substantially different from the voltage profiles provided by those detectors in the absence of that capacitance coupling. Moreover, those skilled in the art will also recognize that the capacitive coupling with and the resulting voltage profiles provided by detectors 126-128/202 may vary substantially as a function of the proximity of any moderately conductive object or a portion of any such object to those detectors.

In some implementations of the invention, act 306 may involve having logic 124 determine, for each of the voltage profile(s) obtained in act 304, the capacitance associated with the profile by determining an integrated voltage value for that profile and then comparing that value to the integrated voltage value as predetermined for a reference voltage profile. Alternatively, in other implementations of the invention, act 306 may involve having logic 124 compare the rate of change of each of the voltage profile(s) obtained in act 304 to the rate of change associated with reference voltage profile. Alternatively, in yet other implementations of the invention, act 306 may involve having logic 124 compare the peak voltage associated with each of the voltage profile(s) obtained in act 304 to the peak voltage associated with reference voltage profile. In other words, act 306 may involve having logic 124 compare the area and/or shape and/or height of each of the voltage profile(s) or a portion thereof obtained in act 304 to the area and/or shape and/or height of a reference voltage profile.

Figure 4:
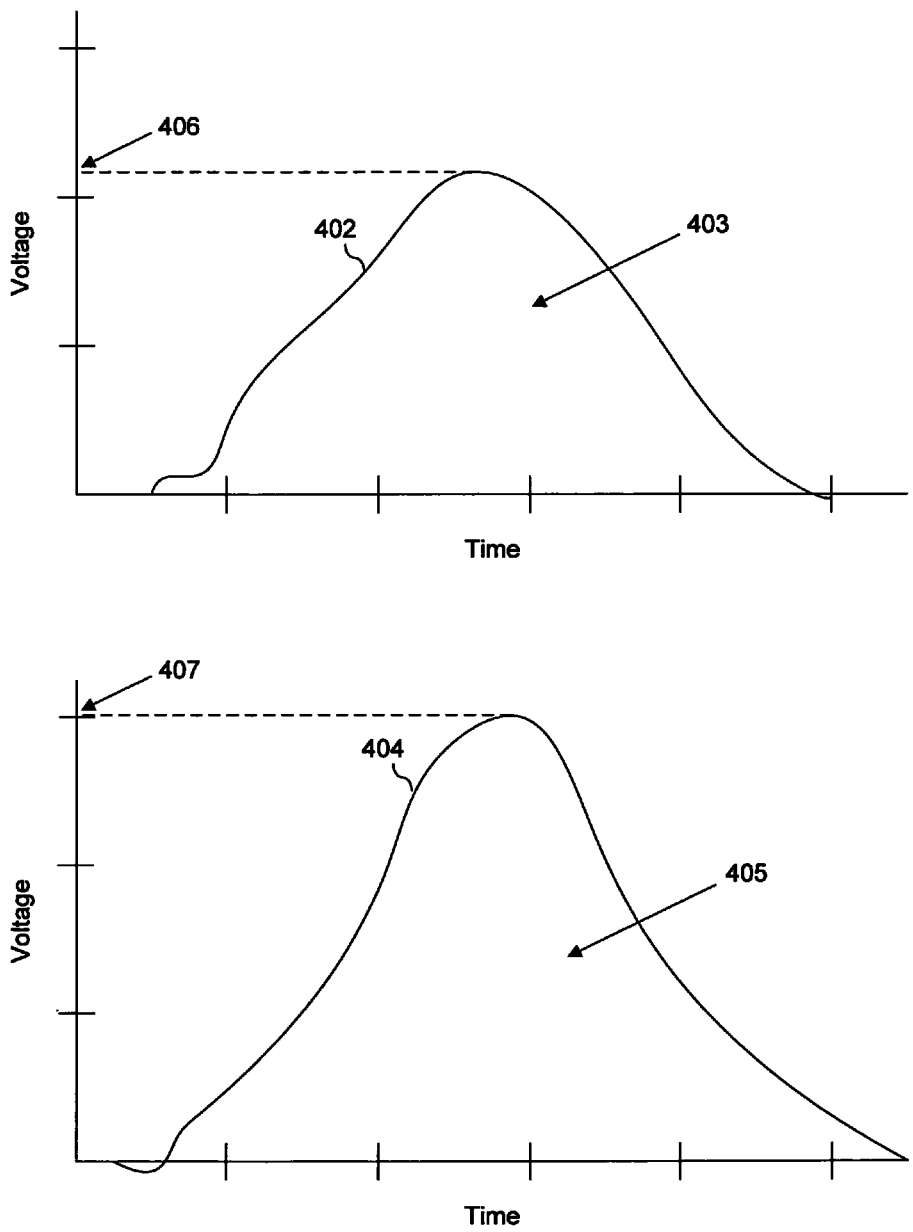
FIG. 4 illustrates portions of representative data signals in accordance with some implementations of the invention.

To illustrate this principle FIG. 4 illustrates two example hypothetical voltage profiles 402 and 404 where profile 402 represents an example voltage profile provided by a capacitance such as one of detectors 126-128/202 in the presence of a proximate object and profile 404 represents an example voltage profile provided by such a detector in the absence of a proximate object (i.e., a reference profile). FIG. 4 is provided purely for pedagogical purposes and should not be considered to limit the invention in any way. Those skilled in the art will recognize that an integrated value for profile 402 may correspond to the area 403 under profile 402 and that an integrated value for profile 404 may correspond to the area 405 under profile 404. With reference to FIG. 4, act 306 may, in some implementations of the invention, involve having logic 124 determine the ratio of the values corresponding to areas 403 and 405. Alternatively, act 306 may, in some implementations of the invention, involve having logic 124 compare a peak voltage value 406 of profile 402 to a peak voltage value 407 of profile 404 by determining those peak voltage values and/or the ratio of those peak voltage values.

The invention is not, however, limited to a particular manner in which act 306 is implemented. Thus, as those skilled in the art of capacitance measurement will recognize, one of any number of well known methods for determining capacitance and/or changes in capacitance may be employed in undertaking act 306.

Process 300 may then continue with the provision of proximity information [act 308]. In some implementations of the invention act 308 may be undertaken by processing logic 124 where processing logic 124 may include logic to determine which pixel region is associated with the largest change in capacitance. Logic 124 may, in undertaking act 308, convey information (i.e., data) identifying that pixel region to pointing logic 126. Alternatively, processing logic 124 may undertake act 308 by conveying data identifying changes in capacitance associated with all pixel regions to pointing logic 126. Pointing logic 126 may then use that data to determine which pixel regions are associated with proximate objects. Thus, for example, processing logic 124 may undertake act 308 by conveying data identifying changes in capacitance associated with a number of pixel regions (e.g., a subset of pixel regions 204) to pointing logic 126 and pointing logic 126 may then use that information to, for example, alter the display characteristics of those identified pixel regions. In some implementations of the invention, act 308 may involve processing logic 124 conveying data identifying changes in capacitance associated with a number of pixel regions and pointing logic 126 may then identify those pixel regions associated with changes in capacitance greater than a predetermined threshold change in capacitance.

In addition, in accordance with some implementations of the invention, processing logic 124 and/or pointing logic 126 may determine, in conjunction with act 308 and based on changes in capacitance determined in act 306, the coordinates (i.e., locations) of those CDEs exhibiting the largest capacitive coupling and may interpolate between those coordinates to determine the pixel location of the display panel exhibiting the greatest proximity to an object and/or the pixel locations of the display panel exhibiting the greatest proximity to a collection of objects. Moreover, in other implementations of the invention, processing logic 124 may undertake act 308 by conveying data identifying changes in capacitance associated with any number of pixel regions (e.g., any of pixel regions 204) to pointing logic 126 and pointing logic 126 may then use that information to, for example, determine where objects in proximity to the display panel are as a function of the pixel coordinates of the display panel.

The acts shown in FIG. 3 need not be implemented in the order shown; nor do all of the acts necessarily need to be performed. Also, those acts that are not dependent on other acts may be performed in parallel with the other acts. For example, acts 306 and 308 may be undertaken in parallel. In other words, changes in capacitance for one or more capacitance detectors may be determined (act 306) at the same time as proximity information associated with other capacitance detectors is being provided (act 308) where that proximity information is derived from an earlier instance of act 306 undertaken with respect to those other detectors. Further, at least some of the acts in this figure may be implemented as instructions, or groups of instructions, implemented in a machine-readable medium.

Figure 5:
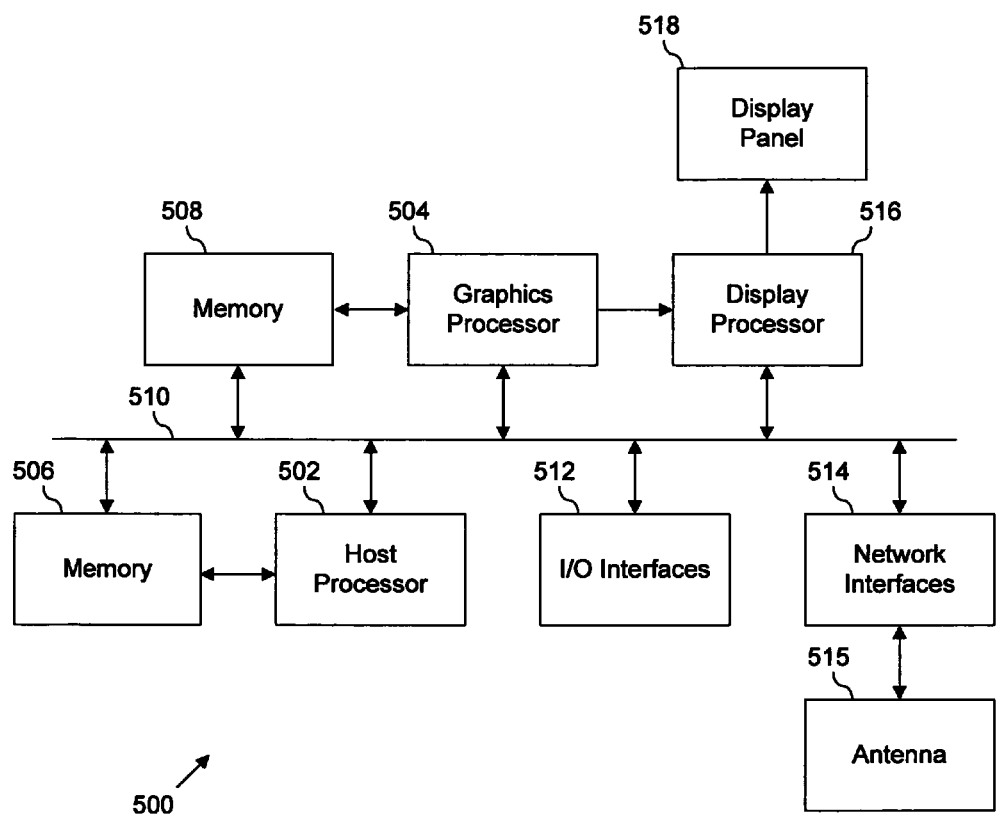
FIG. 5 illustrates a system in accordance with some implementations of the invention.

FIG. 5 illustrates an example system 500 in accordance with some implementations of the invention. System 500 may include a host processor 502, a graphics processor 504, memories 506 and 508 (e.g., dynamic random access memory (DRAM), static random access memory (SRAM), non-volatile memory, etc.), a bus or communications pathway(s) 510, input/output (I/O) interfaces 512 (e.g., universal synchronous bus (USB) interfaces, parallel ports, serial ports, telephone ports, and/or other I/O interfaces), network interfaces 514 (e.g., wired and/or wireless local area network (LAN) and/or wide area network (WAN) and/or personal area network (PAN), and/or other wired and/or wireless network interfaces), a display processor and/or controller 516, and a touch screen display panel 518. System 500 may also include an antenna 515 (e.g., dipole antenna, narrowband Meander Line Antenna (MLA), wideband MLA, inverted "F" antenna, planar inverted "F" antenna, Goubau antenna, Patch antenna, etc.) coupled to network interfaces 514. System 500 may be any system suitable for implementing and/or supporting a flat panel electrical touch screen sensor in accordance with some implementations of the invention.

System 500 may assume a variety of physical implementations. For example, system 500 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 500 may be implemented within a single device, such as a system-on-a-chip (SOC) integrated circuit (IC), components of system 500 may also be distributed across multiple ICs or devices. For example, host processor 502 along with components 506, 512, and 514 may be implemented as multiple ICs contained within a single PC while graphics processor 504 and components 508 and 516 may be implemented in a separate device such as display 518 coupled to host processor 502 and components 506, 512, and 514 through communications pathway 510.

Host processor 502 may comprise a special purpose or a general purpose processor including any control and/or processing logic, hardware, software and/or firmware, capable of providing the functionality of the processing logic and/or the pointing logic and of performing at least some of process 300 as described above. In one implementation, host processor 502 may also be capable of performing any of a number of tasks that support flat panel electrical touch screen sensors. These tasks may include, for example, although the invention is not limited in this regard, providing the select signal to MUX 120, providing a reference voltage profile, downloading microcode (via antenna 515 and interfaces 514) to processors 504 and/or 516, initializing and/or configuring registers within processors 504 and/or 516, interrupt servicing, and providing a bus interface for uploading and/or downloading image data, etc. In alternate implementations, some or all of these functions may be performed by graphics processor 504 and/or display processor 516. While FIG. 5 shows display processor 516 and display 518 as distinct components, the invention is not limited in this regard and those of skill in the art will recognize that processor 516 possibly in addition to other components of system 500 may be implemented within display 518.

Bus or communications pathway(s) 510 may comprise any mechanism for conveying information (e.g., graphics data, instructions, etc.) between or amongst any of the elements of system 500. For example, although the invention is not limited in this regard, communications pathway(s) 510 may comprise a multipurpose bus capable of conveying, for example, instructions (e.g., macrocode) between processor 502 and processors 504 or 516. Alternatively, pathway(s) 510 may comprise a wireless communications pathway.

Touch screen display panel 518 may be any display device incorporating an electrical touch screen sensor in accordance with the invention. Further, in accordance with some implementations of the invention, display panel 518 may include processing logic and/or pointing logic similar to that described above and at least capable of performing at least portions of process 300 as described above. In some implementations of the invention touch screen display panel 518 may be a TFT LCD panel. The invention is, however, not limited to a specific type of display technology employed in display panel 518.

Display processor 516 may comprise any processing logic, hardware, software, and/or firmware, capable of providing the functionality of processing logic 124 and/or pointing logic 126 as described above and at least capable of performing at least portions of process 300 as described above. In addition, while the invention is not limited in this regard, processor 504 may provide image data to processor 516 in a specific color data format, for example in a compressed red-green-blue (RGB) format, and processor 516 may process such RGB data by generating, for example, corresponding LCD drive data levels etc. Although FIG. 5 shows processors 504 and 516 as distinct components, the invention is not limited in this regard, and those of skill in the art will recognize that, for example, some if not all of the functions of display processor 516 may be performed by graphics processor 504 and/or host processor 502.

Thus, in accordance with some implementations of the invention, an inexpensive electrical touch screen sensor may be implemented that does not require additional process steps or layers to a touch screen manufacturing process. In addition, touch screen displays in accordance with the invention may be more robust because the capacitance sensors may be embedded within the display panel rather than being placed on top of the display and because the sensors may operate over a broader temperature range and may not require calibration. Thus, for example, in the case of a TFT LCD touch screen display in accordance with the invention, the sensors may be embedded or formed within the same substrate that the TFTs are formed in. Moreover, processing and/or pointing logic as described herein may be implemented as chip-on-glass application specific integrated circuits (ASICs) or may be integrated into the touch screen display driver chipset. Further, touch screen displays in accordance with the invention may be capable of sensing degrees of proximity as well as touch and may be capable of sensing multiple touches simultaneously.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. Clearly, many other implementations may be employed to provide for an electrical touch screen sensor consistent with the claimed invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. In addition, the use of the term "proximate object" herein is intended to broadly refer to any at least moderately conductive object placed within physical proximity of and/or near to a touch screen panel including an electrical touch screen sensor in accordance with the invention. The use of this term, however, should not be construed to limit the invention to certain ranges of proximity and/or closeness or to a specific spatial relationship and/or orientation between an object and a touch screen panel including an electrical touch screen sensor in accordance with the invention. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An apparatus comprising:
    a display including an array of non-capacitive, image producing display pixels formed in an integrated circuit substrate;
    a plurality of capacitive sensors distributed amongst the display pixels and embedded within the display and integrated with said pixels in said substrate, the sensors to detect capacitive coupling between an object placed in proximity to the display pixels and a sensor;
    a transimpedance amplifier (TIA);
    a capacitance detection element (CDE) coupled to the TIA; and
    a buffer coupled to the CDE.

2. The apparatus of claim 1, wherein the display pixels comprise a plurality of display pixel regions, wherein the each of the sensors is associated with a corresponding one of the display pixel regions, and wherein two or more of the sensors are at least capable of simultaneously detecting changes in capacitance associated with objects placed in proximity to different display pixel regions of the plurality of display pixel regions.

3. The apparatus of claim 1, wherein the TIA is to supply a voltage pulse to the CDE, and wherein the buffer is to obtain a voltage profile from the CDE, the voltage profile to correspond to the voltage pulse as modified by capacitive coupling of an object in proximity to the CDE.

4. The apparatus of claim 1, wherein the CDE comprises a conductive area located adjacent to one of the display pixels.

5. The apparatus of claim 1, further comprising:
    processing logic coupled to the sensors, the processing logic to identify sensors detecting changes in capacitance greater than a reference capacitance.

6. The apparatus of claim 5, further comprising:
    pointing logic coupled to the processing logic, the pointing logic to identify one or more display pixels associated with sensors identified by the processing logic.

7. The apparatus of claim 1, wherein the array of display pixels comprise liquid crystal display (LCD) pixels.

* * * * *